United States Patent
Agrawal et al.

(10) Patent No.: US 7,900,090 B2
(45) Date of Patent: Mar. 1, 2011

(54) SYSTEMS AND METHODS FOR MEMORY RETENTION ACROSS RESETS

(75) Inventors: Sanjay Agrawal, Sunnyvale, CA (US); Thomas W. Simons, Naperville, IL (US); Peter Heffernan, Eastleigh (GB); Daniel J. Delfatti, Jr., Half Moon Bay, CA (US)

(73) Assignee: Oracle America, Inc., Redwood City, CA (US)

( * ) Notice: Subject to any disclaimer, the term of this patent is extended or adjusted under 35 U.S.C. 154(b) by 223 days.

(21) Appl. No.: 12/371,020

(22) Filed: Feb. 13, 2009

(65) Prior Publication Data

US 2010/0211824 A1    Aug. 19, 2010

(51) Int. Cl.
*G06F 11/00*    (2006.01)
(52) U.S. Cl. .......................... 714/30; 714/733
(58) Field of Classification Search .................. 714/23, 714/24, 25, 30, 733, 734; 711/106
See application file for complete search history.

(56) References Cited

U.S. PATENT DOCUMENTS

| 5,465,367 | A  | * | 11/1995 | Reddy et al. ............... 365/222 |
| 2001/0012230 | A1 | * | 8/2001 | Takemae et al. ........... 365/222 |
| 2003/0200382 | A1 | * | 10/2003 | Wells et al. ................ 711/106 |
| 2007/0255895 | A1 | * | 11/2007 | Mangione-Smith ........ 711/106 |
| 2007/0255896 | A1 | * | 11/2007 | Mangione-Smith ........ 711/106 |

* cited by examiner

*Primary Examiner* — Dieu-Minh Le
(74) *Attorney, Agent, or Firm* — Marsh Fischmann & Breyfogle LLP; Kent A. Lembke; Jonathon A. Szumny

(57) ABSTRACT

Systems and methods ("utility") for providing a computer system with a mechanism to record live data on a continuous basis which may be analyzed subsequent to a fault condition is provided. The utility uses the existing DRAM memory of a computer system as a retentive DRAM (RDRAM) device that may be used to store the data. To accomplish this, software and firmware is provided for continuously refreshing the DRAM memory across resets that are due to fault conditions. Further, non-maskable interrupts (NMI) are used to flag a variety of fault conditions to the computer system. To make the utility platform independent, a standardized power and configuration interface is used to implement a computer system reset that preserves the contents of the RDRAM.

20 Claims, 6 Drawing Sheets

SYSTEMS AND METHODS FOR MEMORY RETENTION ACROSS RESETS

BACKGROUND OF THE INVENTION

1. Field of the Invention

The present invention relates generally to improved systems and methods for retaining valuable memory contents of computer systems during a failure. Among other things, this can enable the diagnosing of faults in computer systems that lead to system failures. One example of this is utilizing dynamic random access memory (DRAM) as a retentive device that may be used to record run-time data on a continuous basis, and that may be read and analyzed subsequent to a system failure to assist with the diagnosis of the failure.

2. Relevant Background

Computer systems are widely used in countless applications including personal computers, consumer products, data servers, and the like. Generally, computer systems include at least a processor, memory, and one or more buses that couple the processor to the memory. The memory may include dynamic random access memory (DRAM) that is typically used for the system's main memory, non-volatile memory such as hard disks, read only memory (ROM), and other types of memory. Often, computer systems will include a plurality of I/O devices that include, for example, a keyboard, a mouse, a DVD player, a network interface, or the like.

Computer systems often encounter hardware and software problems that may lead to a system failure or an unintended system state (e.g., a "crash"). As can be appreciated, system crashes are undesirable because the computer system does not perform its intended function. In many cases, much of the memory contents are not degraded as a result of the fault, and it is often desirable to recover the contents of a portion of this memory. An example would be to reduce the incidence of these problems by analyzing and diagnosing the cause of the system failure, so that changes can be made to prevent future system failures. However, this task can be difficult and time consuming.

One method for assisting with the retention of computer system memory during crashes is to save the system memory (e.g., to a hard disk). Special tools and analyzers can then be used to examine the contents of the memory to try and determine the cause of the failure or attempt to recover the contents. However, the above-noted approach of memory retention has certain limitations. For example, a persistent memory device such as a hard disk is needed to save the system memory. This can add significant cost and power requirements to certain computer systems that do not otherwise require a hard disk (i.e., "diskless systems"). Further, this approach requires a device driver that is operable to copy the system memory to the hard disk when a crash occurs. However, under fault conditions, the state of the computer system's operating system may be such that the device driver may not be able to save the system memory, rendering this approach unhelpful. Even when the operation is successful, saving the state to disk may consume multiple minutes, during which the application is unavailable, lowering the overall availability of the system of which the computer is a component.

In diskless computer systems, a special memory component such as a static random access memory (SRAM) or flash memory may be used as the persistent memory device. However, there are several limitations to this approach as well. For example, adding an SRAM or flash memory device increases the cost and complexity of the computer system. Additionally, this approach provides only a fixed memory capacity, which can only be modified by redesigning the computer system. Further, the bandwidth for writing data to these devices is relatively low, which may reduce system performance. Finally, in the case where flash memory is used, there are a limited and finite number of write cycles available, so the flash memory cannot be used as an active device for data logging.

Therefore, there remains a need for systems and methods that facilitate the retention of computer system memory contents during system failures that do not include some or all of the above-noted limitations. Preferably, such systems and methods would provide reliable memory retention capabilities without increasing the cost and complexity of the systems.

SUMMARY OF THE INVENTION

The present invention addresses the above problems by including methods and systems for providing computer systems with the capability to record live information such as debugging data on a continuous basis, and to read the recorded data subsequent to a fault condition in order to diagnose the cause(s) of the fault. Such methods and systems are achieved by utilizing the existing DRAM of a computer system as a retentive DRAM (RDRAM) that persists even across system resets. In this regard, the full memory bandwidth may be used for writing log information, which minimizes any impact on the performance of the computer. Further, by using a computer system's existing DRAM, the RDRAM functionality may be implemented without any changes to the hardware of a computer system.

According to a first aspect of the present invention, a computer system that includes a processor and a DRAM module coupled to the processor is provided. The DRAM module includes predetermined portion that is designated as retentive DRAM (RDRAM). The computer system also includes a refresh module coupled to the DRAM module that is operable to periodically refresh the memory cells of the DRAM module. Further, the refresh module is configured to provide periodic refreshes (e.g., to provide refreshes every several tens of milliseconds) to the memory cells of the DRAM module during a reboot of the computer system such that the contents of the RDRAM are preserved during the reboot.

Various features and refinements to the above-noted computer system may also be provided. For example, in one embodiment, the processor is configured to execute instructions that function to write data to the RDRAM. Further, the computer system may include a software module, executable by the computer system, which is operable to assert a non-maskable interrupt (NMI) in response to a fault condition. The NMI may call an NMI handler that is operable to initiate a reboot of the computer system while preserving the contents of the RDRAM. The computer system may also include a watchdog timer (WDT) that is operable to detect a fault condition in the computer system.

According to a second aspect of the present invention, a RDRAM method is provided that includes storing data in a predefined portion of a DRAM module of a computer system. The method also includes periodically refreshing the memory cells of the DRAM module during a reboot of the computer system such that the contents of the predefined portion are preserved during the reboot.

Various features and refinements to the above-noted method may also be provided. For example, in one embodiment, the method includes reading the data from the RDRAM that was preserved during the reboot. Additionally, the method may include asserting an NMI in response to a fault condition and executing instructions to reboot the computer system while preserving the data stored on the DRAM module. In one embodiment, the asserting of the NMI may be initiated by the expiration of a WDT. Further, the NMI may be asserted by a command received from a component that is external to the computer system, such as a Shelf Manager.

According to a third aspect of the present invention, a method for preserving data that is stored in a DRAM module of computer system during a reboot is provided. The method includes detecting a fault condition in the computer system when the computer system is running in a normal operating state. The method also includes first transitioning the computer system into a standby state in response to the detecting of the fault condition and second transitioning the computer system automatically from the standby state to a soft off state. Further, the method includes third transitioning the computer system from the soft off state back to the normal operating state. The computer system is configured to preserve the data located in a predetermined portion of the DRAM module through the first, second, and third transitioning steps.

Various features and refinements to the above-noted method may also be provided. For example, in one embodiment, the method includes writing data to the predetermined portion of the DRAM module (e.g., the RDRAM). Further, to ensure that the data is current, the computer system may be configured such that the writing of the data is non-cacheable. The method may also include scheduling a real-time clock (ETC) to generate a wake event, wherein the RTC initiates the transitioning step from the soft off power state back to the normal operating power state. Additionally, the method may include asserting an NMI in response to detecting a fault condition (e.g., by the expiration of a WDT), wherein an NMI handler initiates the first transitioning step from the normally operating state to the standby state. The method may also initiate the first transition step as the result of other fault and exception conditions (e.g., an OS panic). Further, the computer system may conform to the Advanced Configuration and Power Interface (ACPI), and the normal operating state may be the ACPI S0 state, the standby state may be the ACPI S3 state, and the soft off state may be the ACPI S5 state.

In addition to the exemplary aspects and embodiments described above, further aspects and embodiments will become apparent by reference to the drawings and by study of the following descriptions.

DETAILED DESCRIPTION OF THE PREFERRED EMBODIMENTS

Embodiments of the present invention are directed to methods and systems for providing computer systems with the capability to record live information on a continuous basis, and to read the recorded data subsequent to a fault condition in order to preserve the original memory contents. Such methods and systems are achieved by utilizing the existing dynamic random access memory (DRAM) of a computer system as a retentive DRAM (RDRAM) that persists across system resets. In this regard, the full memory bandwidth may be used for writing information to be retained, which minimizes any impact on the performance of the computer. Further, by using a computer system's existing DRAM, the RDRAM functionality may be implemented without any changes to the hardware of a computer system.

DRAM is a type of random access memory that stores each bit of data in a separate capacitor within an integrated circuit. Since capacitors leak charge, the information eventually fades unless the capacitor charge is refreshed periodically by a refresh module (e.g., a memory controller). Because of this refresh requirement, it is a "dynamic" memory as opposed to SRAM and other static memory. Typically, DRAM manufacturers specify that each memory cell should be refreshed periodically (e.g., every 64 ms or less). This makes the circuitry more complicated than the circuitry needed for SRAM, but this drawback is usually outweighed by the fact that DRAM is much cheaper and of greater capacity. The primary advantage of DRAM is its structural simplicity: only one transistor and a capacitor are required per bit of information, compared to six transistors that are required for SRAM. This feature allows DRAM to reach very high density. Like SRAM, it is in the class of volatile memory devices, since it loses its data when the power supply is removed. However, unlike SRAM, data may still be recovered for a short time after the computer system is powered off.

The systems and methods of the present invention provide a software and firmware based mechanism that preserves the contents of a portion of a computer system's DRAM (referred to herein as RDRAM) even through hardware resets. Embodiments of the present invention allow for implementation of a diagnosis system without any hardware modifications, which reduces cost and complexity, and which enables flexible upgrades and modifications. The invention may also permit the full main memory bandwidth to be used for writing the live information, which results in a negligible performance impact. Further, the invention may not be dependent upon device drivers, so that the invention works even when the operating system (OS) is in a state such that device drivers are not operational. Additionally, the invention may be implemented across multiple hardware platforms and system architectures.

Figure 1:
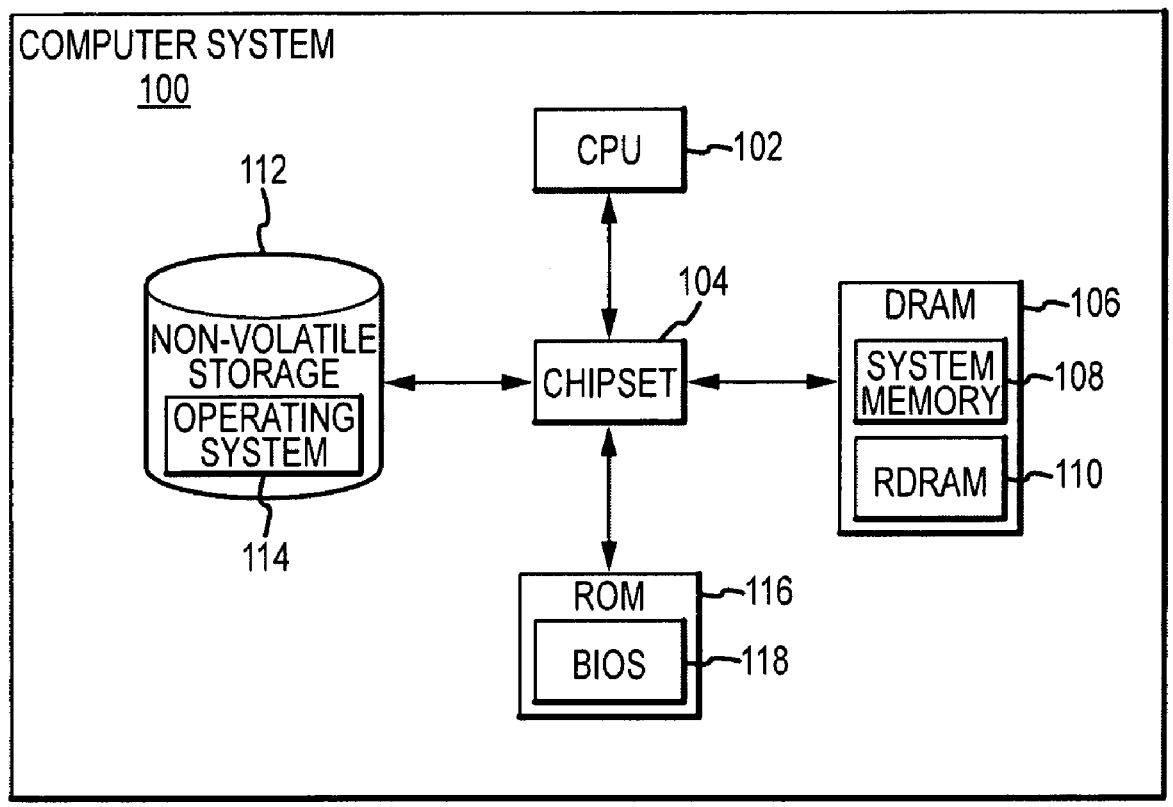
FIG. 1 illustrates a block diagram of a computer system that includes retentive DRAM (RDRAM).

FIG. 1 illustrates a block diagram of a computer system 100 that includes retentive DRAM (RDRAM 110). The computer system 100 includes a core logic chipset 104 that acts as a switch or router and routes data traffic among the different devices that make up the system 100, including a processor 102, system memory 106, flash ROM 116 and non-volatile storage 112 (e.g., a hard disk, flash ROM, or other non-volatile memory). In some instances, the chipset 104 may be split into two parts generally referred to as the northbridge (or memory controller hub) and the southbridge (or I/O bridge). The northbridge generally couples the system's memory 106 to the processor 102 and has a relatively fast data transfer rate. Further, the northbridge is generally operable to refresh the memory cells of the system memory 106. The circuitry and/or logic that provides the refreshes for the system memory 106 may generally be referred to as a "refresh module." The refresh module may be located in the chipset 104 or in any other component, or may be a separate module altogether. In some systems that include a display, the northbridge may also be coupled to a video card. The northbridge may generally be tied to the southbridge of the chipset 104, which routes traffic from the different I/O devices on the system, including the non-volatile memory 112 and the ROM 116. The data traffic from these devices may be routed through the southbridge to the northbridge and then to the processor 102 and/or the memory 106. As can be appreciated, the chipset 104 may be included in the same integrated circuit (IC) as the processor 102, or may be a separate IC.

The ROM 116 may include permanent or semi-permanent program code that is referred to as a Basic Input/Output System (BIOS) 118. Generally, the BIOS 118 is firmware code run by the system 100 when first powered on, which is a type of boot loader. The primary function of the BIOS 118 is to identify and initialize system component hardware (such as the system memory 106, non-volatile memory 112, or the like). This is to prepare the system 100 into a known low capability state, so that other software programs (e.g., an operating system 114) stored on various media can be loaded, executed, and given control of the computer system 100. The BIOS 118 may also recognize and control various devices that make up computer system 100, and provide a small library of basic Input/Output functions that can be called to operate and control the devices.

As shown in FIG. 1, the DRAM system memory 106 includes a portion that is used as RDRAM 110 that is configured to be retentive across hard resets and reboots of the computer system 100. That is, the RDRAM 110 will continue to be refreshed during a reboot of the system 100 so its data are preserved. To enable this feature, the BIOS 118 and the operating system 114 are configured in a manner that is described in detail below.

Figure 2:
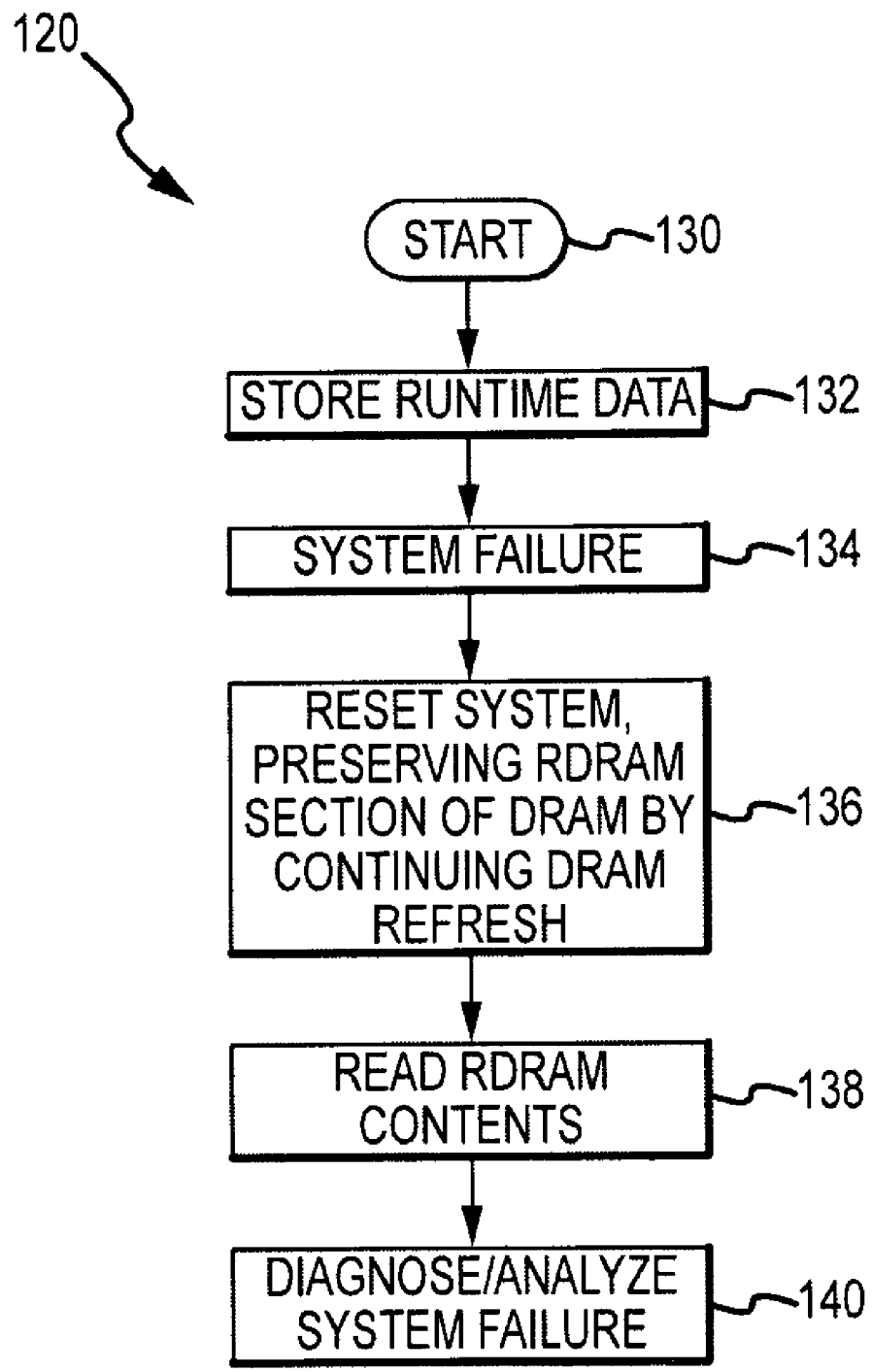
FIG. 2 is a flowchart that illustrates a method for preserving the contents of the RDRAM during a recovery from a fault condition.

FIG. 2 is a flowchart that illustrates a method 120 for preserving the contents of the RDRAM 110 during a recovery from a system failure. The method 120 starts at step 130, when the computer system 100 is operating normally. At step 132, the system 100 is continuously recording live information (e.g., runtime data) to the RDRAM 110. Such information or data could include any type of useful information about the computer system 100, including logs, checkpoints, interrupt events, contents of the processor's registers, any type of system or application state information, or any other useful data (e.g., a database) that may need to be retained across a reboot for any reason. By way of example, the state data could include an in-memory database for call processing that would be able to achieve higher capacity by relying on memory retention rather than storage or redundancy to enhance data longevity. Those skilled in the art will readily recognize that it may be desirable to store other forms of data in the RDRAM.

At step 134, a system failure or fault condition occurs. The system failure can generally be anything that causes the OS to exit abnormally other than a normal shutdown procedure. For example, the operating system 114 may stop responding ("hang") for a variety of reasons and may require the system 100 to restart or reboot. Additionally, the OS may detect a non-recoverable fault condition that forces a system panic. Further, if the computer system 100 is part of a larger computer system, that larger system may issue a reset command to the computer system 100. For example, in the instance where the computer system 100 is a single board in a shelf that includes a plurality of boards, the Shelf Manager may issue administrative commands that can result in a hard reset of the computer system 100. The computer system 100 may be configured in such a way that when an external computer system issues a reset command, it first invokes an NMI (e.g., the NMI handler achieves the effect of a reset, as described below with reference to FIG. 5). Only in rare cases where the NMI handler cannot be executed would a hard reset be required. It should be noted that in such a scenario, when a hard reset is initiated on the computer system 100, the RDRAM contents might potentially get lost. This is because the system 100 would not have the opportunity to put the DRAM in self-refresh before restarting the boot sequence.

Figure 3:
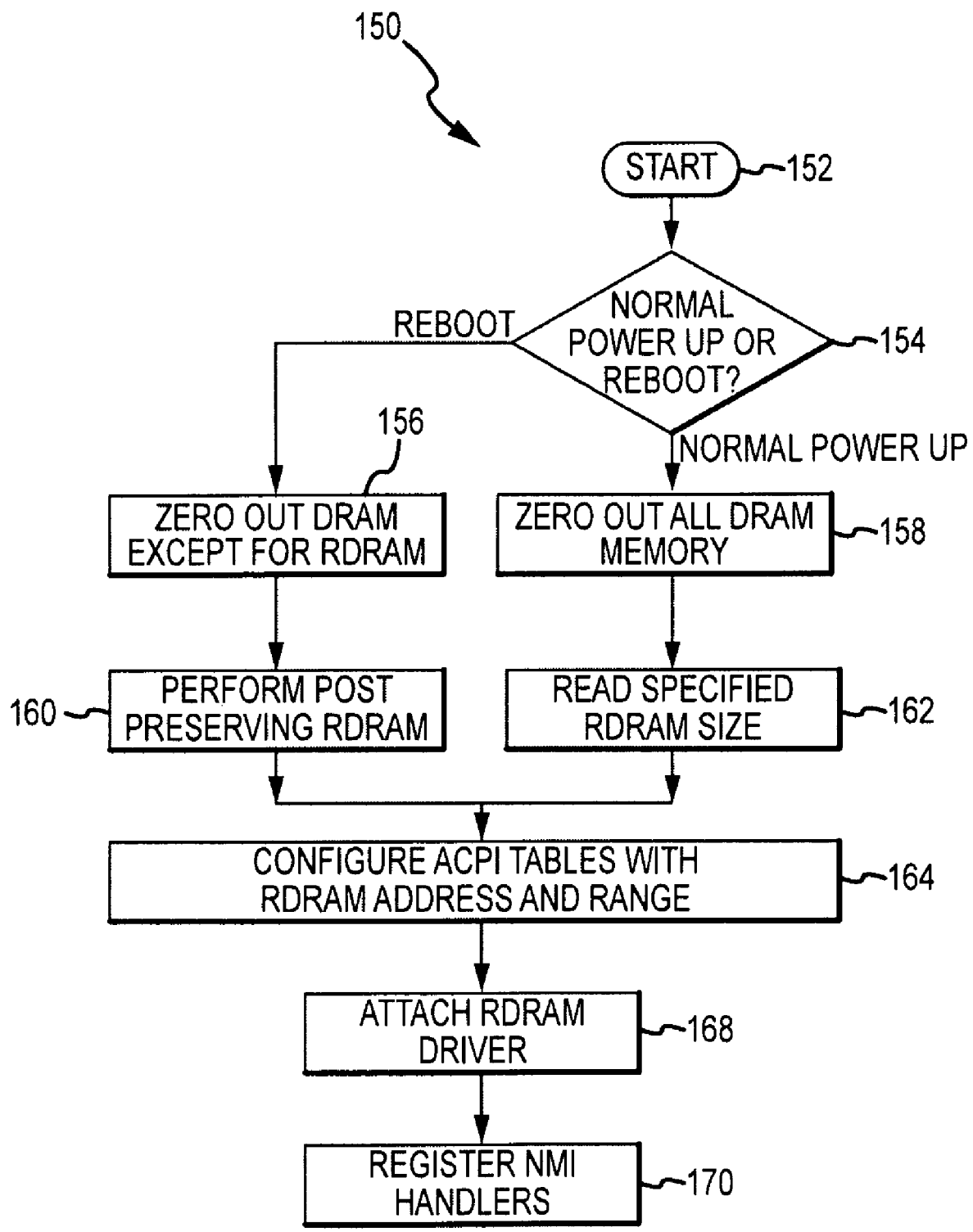
FIG. 3 is a flowchart that illustrates a boot sequence for a computer system that includes RDRAM.

It has been determined that DRAM contents may persist for several tens of seconds even without a refresh. Therefore, in the rare situation when a hard reset is required, there is still a fair chance that the RDRAM contents would be available across the hard reset. Generally, the OS checks for RDRAM integrity before using it. If for certain reasons, the OS wants to discard the RDRAM contents and would like a fresh reboot with a fully initialized RDRAM, it could set up a flag in the BIOS to treat the next reboot as Normal Power-Up, as shown in FIG. 3, and initiate a reboot. The subsequent boot up sequence would then be a Normal Power Up sequence.

At step 136, the computer system 100 responds to the system failure by performing a hard reset while continuing to refresh the RDRAM 110, such that the contents of the RDRAM 110 are preserved. The specific implementation of step 136 is described in more detail below with reference to FIGS. 3-6. When the system 100 has recovered from the system failure (e.g., after the system has been reset), the operating system or an application may read the contents of the RDRAM 110, at step 138. Finally, the contents of the RDRAM 110 may be analyzed using suitable tools to recover important data such as that needed to diagnose the cause of the system failure, step 140.

FIG. 3 is a flowchart that illustrates a boot sequence 150 for the computer system 100 that includes RDRAM 110. The boot sequence 150 starts at step 152. Initially the BIOS 118 may determine whether the boot sequence is a normal power up or a recovery power up (i.e., a reboot), step 154. In this regard, if the boot sequence is a normal power up, there is no need to preserve the contents of the RDRAM 110 since there is no data to retain.

To determine the type of boot sequence to perform, the BIOS 118 may read a CMOS variable that specifies whether it is a normal power up or reboot. The default setting on a new computer system is Normal Power up. Once the system is booted, the OS may be expected to toggle this variable to indicate a Reboot. This is to prevent subsequent reboots of the system from wiping off the contents of the RDRAM.

If the BIOS determines that the boot sequence is a normal power up, the BIOS may initialize an error correction code (ECC) and zero out the system memory, step 158. However, if the BIOS determines that the boot sequence is a recovery from a fault condition, the BIOS will initialize an ECC and zero the system memory, leaving the RDRAM portion of the DRAM undisturbed, step 156, so that the contents of the RDRAM portion may be read by an application or the OS after the recovery.

During a power on self test (POST), the BIOS may find, size (step 162), and verify the system memory and RDRAM, step 160. As can be appreciated, if the boot sequence is a recovery from a system failure, then the BIOS should ensure that the RDRAM contents are preserved during the verification of the DRAM. This may be accomplished by copying the RDRAM contents to a region of system memory that has already been verified prior to verifying the RDRAM portion of the DRAM. Further, it may be desirable to verify that the contents of the RDRAM were correctly copied over to the other region of memory prior to modifying the contents of the RDRAM to ensure that the RDRAM can be restored. After the RDRAM region has been verified by the BIOS, the data may then be copied back to the RDRAM region, followed by verification that the copying was successful.

Once the BIOS has completed the POST, it may provide the OS with the start address and size (e.g., 8 MB, 32 MB, 64 MB, or the like) of the RDRAM in the DRAM, for example, by configuring appropriate Advanced Configuration and Power Interface (ACPI) Tables, step 164. ACPI is an industry standard interface specification that enables OS-directed configuration, power management, and thermal management of computer systems. ACPI defines hardware registers, BIOS interfaces that include configuration tables and a control methods interface, and system power states.

Then, the OS may read the ACPI tables to receive the start address and size, initialize the RDRAM, and attach a RDRAM driver, step 168. The RDRAM driver may be configured such that the RDRAM is treated differently than the rest of system memory. For example, the RDRAM may be non-cacheable since the cache may not get flushed during certain fault handling scenarios, which may cause the contents of the RDRAM to not accurately represent the state of the computer system at the time of the fault.

Finally, the OS may register appropriate non-maskable interrupt (NMI) handlers that are associated with the RDRAM, step 170. The function of the NMI handlers is discussed in more detail below with reference to FIG. 4. Generally, an NMI is a computer processor interrupt that cannot be ignored by standard interrupt masking techniques in the computer system. NMI's are typically used to signal attention for non-recoverable hardware errors or system resets.

Figure 4:
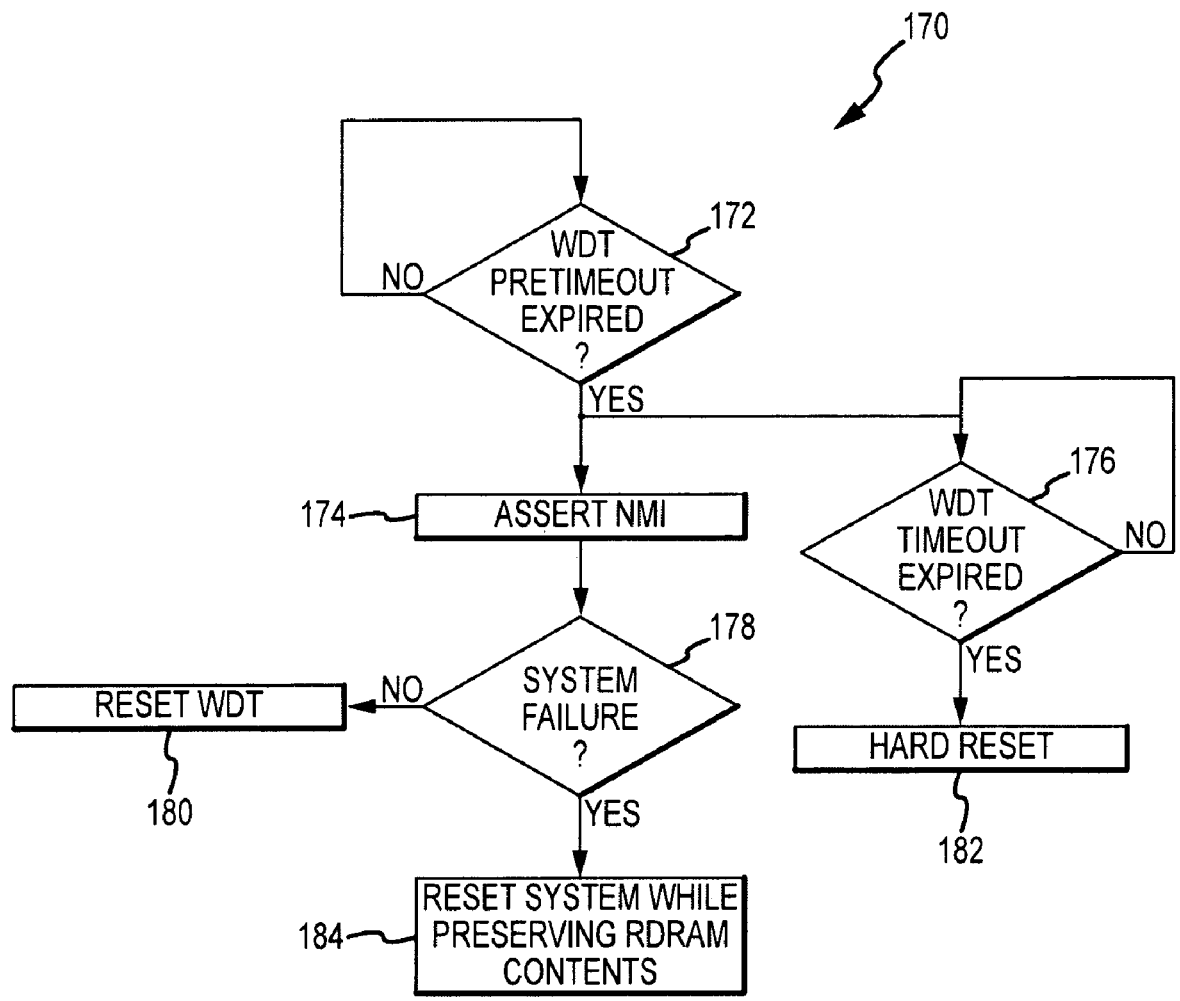
FIG. 4 is a flowchart that illustrates the use of NMI handlers to preserve the contents of RDRAM during a recovery from a fault condition.

FIG. 4 is a flowchart 170 that illustrates the use of NMI handlers to preserve the contents of the RDRAM during a recovery from a fault condition that is detected by a watchdog timer (WDT). As shown, the computer system includes a two-stage WDT. Generally, a WDT is a computer hardware-timing device that triggers a system reset if the main program (e.g., the OS), due to some fault condition, neglects to regularly service the WDT (e.g., by writing a "service pulse" to it), with the premise that failure to write a service pulse implies that the program has become inoperable and must be restarted after reloading all software into the DRAM. The intention of the WDT is to provide a mechanism to reset the system when a fault condition occurs. The two-stage WDT provides essentially two timers having two different time periods, a pretimeout and a timeout.

Initially, the WDT is continuously checking to see if the pretimeout period has expired, step 172. As long as WDT is being serviced, the pretimeout period will not expire. However, if the pretimeout period expires because the OS has failed to service it, an NMI is asserted which passes control to an NMI handler, step 174. The NMI handler may first check to see if the NMI was spurious (e.g., the OS is not really locked up), step 178. If that is the case, the NMI handler may simply reset the WDT so that the system may continue to operate normally, step 180. However, if the NMI handler determines that a fault condition has in fact occurred, the NMI handler will take steps to reset the computer system in a manner that will preserve the contents of RDRAM, step 184. That is, the NMI handler is used to initiate a "RDRAM reset" (e.g., a reset that preserves the contents of RDRAM), rather than a conventional hard reset that would otherwise cause the contents of RDRAM to be lost.

When the NMI is asserted, the WDT may also determine if the timeout period, which is longer than the pretimeout period, has expired without being serviced, step 176. This feature may be useful in instances when the computer system is in a state where even the NMI handler may not be able to execute properly. In this case, when the timeout period expires, the WDT may issue a conventional hard reset to the system, which may result in the loss of the contents of RDRAM.

It should be appreciated that although the NMI handler described in reference to FIG. 4 operates with OS lock ups that are detected by a WDT, NMI handlers may be used to transition the computer system through a RDRAM reset when other events occur. For example, in the instance where the computer system is a single board in a shelf that includes a plurality of boards, the Shelf Manager may issue a reset command to the system. In this case, the Shelf Manager may be configured to first issue an NMI command so that an NMI handler may initiate a RDRAM reset instead of a conventional hard reset. As another example, a "reset" switch of the computer system may be configured to assert an NMI, rather than a hard reset, to allow a RDRAM reset to occur. As yet another example, the OS may be configured to permit RDRAM resets, for example, in instances when the OS enters into an unknown state, and an OS panic handler is called to reset the system. In addition to using NMI handlers, other fault handlers that are used for other faults that may be reported to the OS may be modified to allow for RDRAM resets as well.

Figure 5:
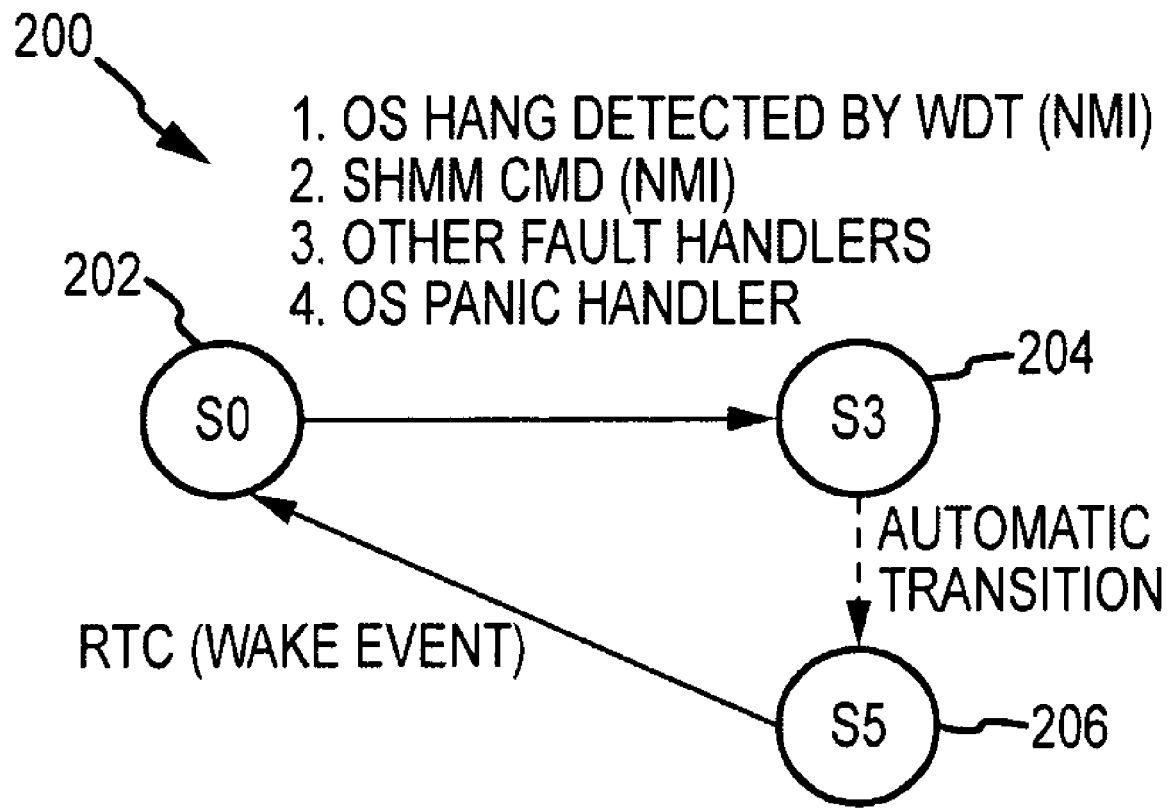
FIG. 5 is a state diagram of the state transitions for a computer system in response to a fault condition.

FIG. 5 is a state diagram 200 of the power state transitions for a computer system that executes a RDRAM reset (e.g., in response to a fault condition). As shown, the ACPI interface specification and defined power states, which are normally used for power management, are utilized by the system to perform the RDRAM reset. In this regard, the RDRAM may easily be implemented across multiple platforms that use the standard ACPI interface specification. The RDRAM reset procedure illustrated by FIG. 5 utilizes three ACPI power states; namely S0, S3, and S5 power states 202, 204, 206. The S0 power state 202 is the normal working state of a computer, wherein the operating system and applications are running. The S3 power state 204 is referred to as the "Suspend-to-Ram" (STR) state or "Standby" state. In this state, the DRAM is still powered, and most or all other components in the system are powered off. The S3 power state 204 has previously been used to provide a very low power state that enables a user to resume work exactly where they left off, since the state of the operating system and all applications, open documents, and the like reside in main memory. In other words, the "context" of the system is preserved. The S5 power state 206 is generally referred to as "Soft Off" state. In the S5 power state 206, most of the system is powered off, but some components remain powered so that the computer system can "wake" from input from a keyboard, clock, modem, LAN, USB device, or the like. Further, the computer system must execute a boot sequence (see e.g., FIG. 3) to transition from the S5 power state 206 back to the S0 power state 202 (the working state).

In operation, when a fault condition occurs, the computer system is transitioned from the S0 power state 202 to the S3 power state 204 ("Suspend-to-Ram" or "S0-S3 transition") by a fault handler, as described above. As shown, the fault handlers may include NMI handlers, an OS panic handler, or other fault handlers. Next, the ACPI specified behavior of the computer system has been modified such that the system automatically transitions from the S3 power state 204 to the S5 power state 206 ("Soft off"), which has the effect of discarding the CPU and cache context of the system. This is desirable because only the contents of the RDRAM should be preserved, while the context of the CPU and cache should be cleared during the RDRAM reset.

Prior to initiating the S0-S3 transition, a real-time clock (RTC) may be programmed to a relatively low value and may be used to generate a wake event that operates to transition the computer system from the S5 power state 206 back to the S0 power state 202 (the operating state). Using this procedure, the effect of a hard reset may be achieved (e.g., the CPU and cache contexts are not preserved) while preserving the contents of the RDRAM. It should be appreciated that, using this procedure, the contents of the system memory will be preserved as well as the contents of the RDRAM. However, if desired, the contents of the system memory may be zeroed out during the boot sequence (see e.g., steps 156 and 158 of FIG. 3).

Figure 6:
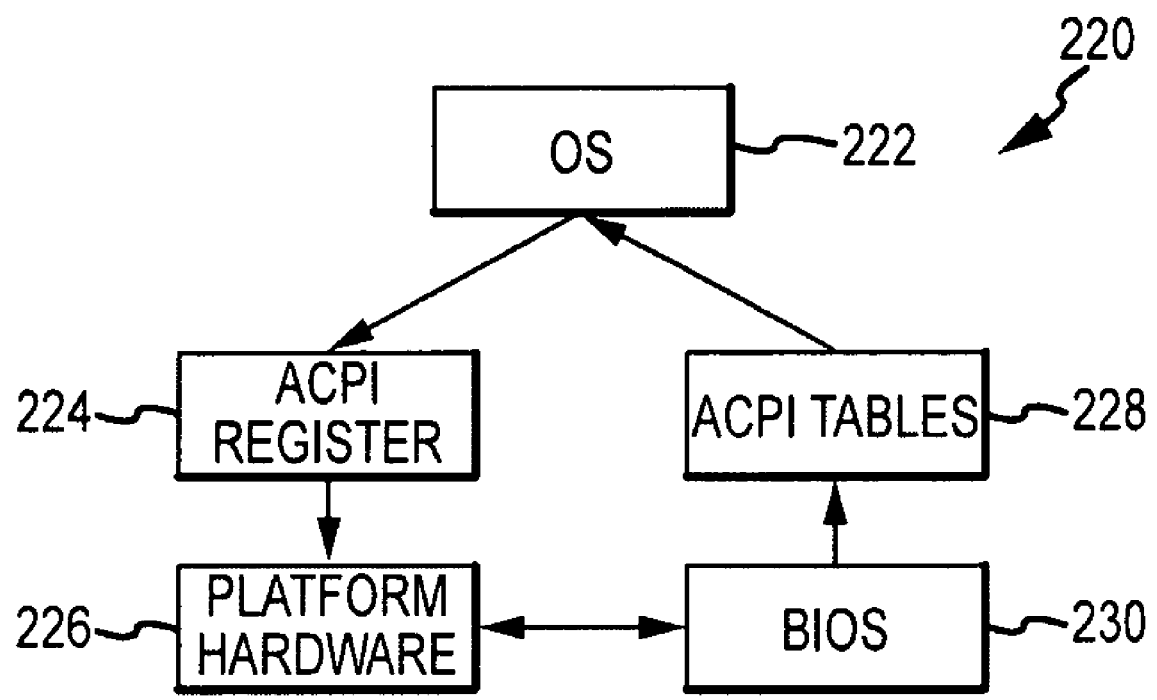
FIG. 6 illustrates a block diagram of a BIOS-OS (Operating System) interface for a computer system that includes RDRAM.

FIG. 6 illustrates a block diagram of a BIOS-OS (Operating System) interface 220 for a computer system that includes RDRAM. As shown, the BIOS 230 provides the addresses of the ACPI power management control registers to the OS 222 using ACPI Tables 228 residing in system memory. The OS 222 may then use the ACPI register interface to program the ACPI power management control register 224 to place the computer system hardware 226 into the desired power state (e.g., the ACPI S0, ACPI S3, or ACPI S5 power states). As can be appreciated, using the ACPI register interface between the BIOS and the OS makes the RDRAM feature a platform independent feature that requires no hardware changes and little or no OS changes to support a plurality of different computer systems.

It should be appreciated that although the examples provided above relate to analyzing failure data after a system failure, the applicability of various embodiments of this invention is far wider than just analyzing failure data. For example, the OS may allow applications to write data to the RDRAM. Such data may include checkpoint data, application state data, or any other type of data. In this regard, when the computer system recovers after a crash, applications can recover their state and resume from where they left off prior to the crash. Applications may also use the RDRAM for transactional integrity, wherein they may use the RDRAM for "intent logging" before they actually commit data to a non-volatile data storage medium, such as a hard disk.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

We claim:

1. A computer system, comprising:
   a processor;
   a dynamic random access memory (DRAM) module coupled to the processor, wherein a predetermined portion of the DRAM module is designated as retentive DRAM (RDRAM); and
   a refresh module coupled to the DRAM module and operable to periodically refresh the memory cells of the DRAM module;
   wherein the refresh module is configured to provide periodic refreshes to the memory cells of the DRAM module during a reboot of the computer system such that contents of the RDRAM are preserved during the reboot, the reboot including at least one boot sequence executed by the computer system.

2. The computer system of claim 1, wherein the processor is configured to execute instructions that function to write data to the contents of the RDRAM.

3. The computer system of claim 1, wherein the refresh module is configured to provide refreshes to the memory cells of the DRAM module during a reboot that is initiated by the occurrence of a fault condition.

4. The computer system of claim 3, further comprising:
   a software module, executable by the computer system, that is operable to initiate a transition into a standby state in response to the fault condition detected by software, and wherein the software module is further operable to cause a reboot of the computer system.

5. The computer system of claim 4, further comprising a mechanism that is operable to detect the fault condition, wherein the mechanism is further operable to determine that the reboot did not occur, and in response to the determination, to initiate a hard reset of the computer system.

6. The computer system of claim 3, further comprising:
   a software module, executable by the computer system, that is operable to assert a non-maskable interrupt (NMI) in response to a fault condition; and
   an NMI handler module, executable by the computer system, that is operable to cause a reboot of the computer system;
   wherein the contents of the RDRAM are preserved during the reboot.

7. The computer system of claim 6, further comprising a mechanism that is operable to detect the fault condition, wherein the mechanism is further operable to determine that the reboot did not occur, and in response to the determination, to initiate a hard reset of the computer system.

8. A method, comprising:
   storing data in a predefined portion of a dynamic random access memory (DRAM) module of a computer system; and
   periodically refreshing the memory cells of the DRAM module during a reboot of the computer system such that the contents of the predefined portion are preserved during the reboot, the reboot including at least one boot sequence executed by the computer system.

9. The method of claim 8, wherein the data includes information relating to events of the computer system.

10. The method of claim 9, further comprising, after the reboot, reading the data from the predefined portion of the DRAM module.

11. The method of claim 10, wherein the reading is performed by an application running on the computer system.

12. The method of claim 8, further comprising:
    initiating a transition into a standby state to place the memory into self refresh, wherein the initiating results from at least one of a fault condition or an exception condition that is detected by software.

13. The method of claim 8, further comprising:
    asserting a non-maskable interrupt (NMI) in response to a fault condition that is detected external to a processor of the computer; and
    executing instructions to reboot the computer system while preserving data stored on the DRAM module.

14. The method of claim 13, wherein the asserting step is initiated by one of the expiration of a watchdog timer (WDT) and a command received from a component external to the computer system.

15. A method for preserving data stored in a dynamic random access memory (DRAM) module of computer system during a reboot, the method comprising:

detecting a fault condition in the computer system when the computer system is running in a normal operating state;

first transitioning the computer system into a standby state in response to the detecting of the fault condition;

second transitioning the computer system automatically from the standby state to a soft off state; and third transitioning the computer system from the soft off state to the normal operating state the third transitioning including execution of at least one boot sequence;

wherein the computer system is configured to preserve the data located in a predetermined portion of the DRAM module through the first, second, and third transitioning steps.

16. The method of claim 15, further comprising writing data to the predetermined portion of the DRAM module.

17. The method of claim 16, wherein the computer system is configured such that the writing of data is non-cacheable.

18. The method of claim 15, further comprising a mechanism to automatically initiate the third transitioning step.

19. The method of claim 15, further comprising asserting a non-maskable interrupt (NMI) in response to the detecting the fault condition step, wherein the first transitioning step is initiated by an NMI handler.

20. The method of claim 15, wherein the computer system conforms to the Advanced Configuration and Power Interface (ACPI) specification, and wherein the normal operating state is the ACPI S0 state, the standby state is the ACPI S3 state, and the soft off state is the ACPI S5 state.

* * * * *